SYSTEM FOR TESTING LINE CIRCUITS IN A MULTIPLEX EXCHANGE SYSTEM, AND FOR PERFORMING OPERATING PROCESSES INDICATED BY SUCH TESTS

Filed Sept. 23, 1965

2 Sheets-Sheet 1

Feb. 3, 1970 M. SCHLICHTE ET AL 3,493,683

SYSTEM FOR TESTING LINE CIRCUITS IN A MULTIPLEX EXCHANGE SYSTEM, AND FOR PERFORMING OPERATING PROCESSES INDICATED BY SUCH TESTS

Filed Sept. 23, 1965 2 Sheets-Sheet 2

United States Patent Office
3,493,683
Patented Feb. 3, 1970

3,493,683
SYSTEM FOR TESTING LINE CIRCUITS IN A MULTIPLEX EXCHANGE SYSTEM, AND FOR PERFORMING OPERATING PROCESSES INDICATED BY SUCH TESTS

Max Schlichte and Dieter Voegtlen, Munich, Germany, assignors to Siemens Aktiengesellschaft, Munich, Germany Filed Sept. 23, 1965, Ser. No. 489,500
Claims priority, application Germany, Sept. 30, 1964, S 93,488
Int. Cl. H04j 3/02
U.S. Cl. 179—15 13 Claims

ABSTRACT OF THE DISCLOSURE

The invention provides a method and apparatus for testing the condition of telephone line circuits and the like, to determine when operating processes are required to be carried out by demand of the line circuits. The number of circuits that can be tested by a testing system is multiplied by testing a plurality of line circuits during the time conventionally required to test a single circuit. This is accomplished by providing a basic address common to a plurality of line circuits and testing, either sequentially or simultaneously, each of the line circuits having that basic address, which are not then participating in an existing connection.

Figure 1:
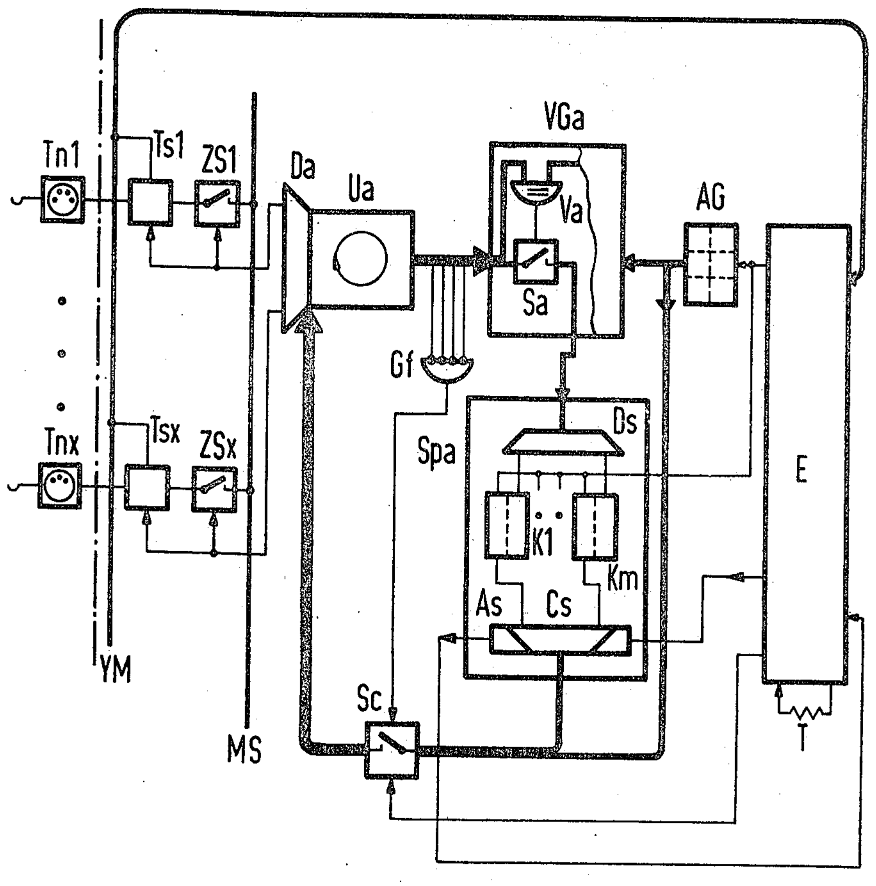

In the process of development of exchange systems, various changes have been made therein leading to the development of exchange apparatus which is required only for the establishment and interruption of connections between connection lines connected to such a system. In order that the operating processes required by the individual lines can be performed, corresponding change information or criteria must be forwarded to the central control apparatus. These criteria can be derived from the existence of a particular operating condition for the respective connection line.

In order to be able to ascertain the operating conditions demanding an operating process, namely the allocation of a dial information furnishing register, for a plurality of connection lines of an exchange system, it is already known that the connection lines can be interrogated by means of a successive scanning apparatus common to the connection lines belonging to the exchange system, and that the results of such scanning can be stored in a storage element assigned to the respective connection lines. Only when the operating condition of the respective connection line is changed from the interrogation result contained in the respective storage element, is a suitable dial information-responsive apparatus assigned to this connection line. Such a process for successive interrogations requires a relatively long time for interrogation of the connection lines belonging to an exchange system.

Since the time period between successive testings of the same connection line is generally limited, such a process as described above correspondingly limits the maximum number of connection lines which can be served by the central control apparatus. In order to allow a greater number of connection lines to be provided in such an exchange system, it is already known from German Patent No. 905,380 that as many as 10,000 subscribers can be connected together in a time multiplex exchange system, with 200 subscribers in a group, and with each group provided with a separate scanning and control apparatus for the interrogation of the subscribers in that group and for the performance of the necessary exchange processes required for the subscribers of that group. Each group is provided with an individual impulse generator which supplies a pulse in each scanning period, to 200 series-connected sections of a delay line providing a delay of the length of the scanning period. Each subscriber of the group is connected to one of these 200 series connected sections. These subscribers are successively interrogated by such pulse and, in response thereto, provide criteria characteristic of their loop condition. By reason of the transmission of these criteria, any required operating process is performed by the group control apparatus with which an individual line finder and a subsequent group selector are associated.

In the above-described method, of course, an analogous method is performed for each group of subscribers so that the exchange system can serve the connection lines connected to it in a shorter time than a purely sequential interrogation of the connection lines would require. However, this reduction of time is at the expense of higher costs for the switching equipment.

The invention provides an entirely different way of ascertaining the operating condition of a subscriber requiring an operating process, in an exchange system having many connection lines associated therewith, and also in causing performance of operating processes in dependence upon the information so ascertained. The invention deals with a method of performing operating processes in an exchange system having a large number of connection lines associated therewith, employing a central control apparatus and a control generator common to all of the connection lines. Each control generator provides successive signals for identification of the connection lines, these signals being provided for the testing of the connection lines with respect to their operating condition, and for the performance of the operating processes required thereby. This process is particularly characterized in that, upon supply at any given time of a signal identifying a plurality of connection lines ($Ts1 \ldots Tsx$), the lines are simultaneously tested for a time period required for the testing of only one such connection line ($Ts$). Then after joint testing of the so-identified lines during this time period, concerning their operating condition, the operating processes are performed for an operating condition exhibited by the connection lines ($Ts$) which demands that process.

The method of the invention has the advantage that the control generator provides, at any given time, a signal identifying a plurality of connection lines and the jointly identified lines in such fashion are tested for their operating conditions during a time period which is the same as that required for the testing of a single such connection line. As a result, a single central control apparatus can jointly serve a much larger number of connection lines than could be served through purely serial interrogation of the connection lines, so that only a single central control apparatus is required for all of the connection lines, even if a large number of lines is connected to the exchange system. Thereby there is procured the particular advantage that the performance of the required operating process, after the testing of the jointly-identified connection lines, can be performed only for one of the connection lines found in the corresponding operating condition, with any subsequently required operating processes being performed thereafter for further connection lines found in corresponding operating conditions. Since the performance of such an operating process is required only for a fraction of the connection lines interrogated at any given time as to their operating condition, for this reason also, only a single control apparatus is required for a large number of connection lines.

According to a modification of the process of the invention, the connection lines identified at any given time are tested successively during the joint identification, by a common testing apparatus. This has the advantage of reduction in expense.

According to a different modification of the process of the invention the connection lines identified at any given time are simultaneously tested during the said time period, through testing apparatus individually assigned to them. Compared to the aspect of the invention mentioned immediately above, the use of individual testers requires greater expense, but the testing time is further reduced.

According to a further aspect of the process of the invention, after the testing of the simultaneously-identified connection lines for the existence of opertating condition requiring an operating process, it can be provided that the required operating process be performed only for a single connection line found in this respective operating condition. Such an operating manner requires only a very small additional expense for the evaluation of the result of the testing obtained from the simultaneously-identified connection lines, for their respective operating conditions. Because of the special speed of the process of the invention, no unduly high waiting time occurs for the connection lines not immediately subject to the required operating processes.

It is also possible, following the testing of the simultaneously-identified connection lines to perform the required operating processes only for selected connection lines found in the respective operating condition. In such fashion, no special waiting time is required for the performance of the required operating processes in respect of these selected lines.

Finally it is possible, following the testing of the simultaneously-identified connection lines, that all connection lines found in an operating condition requiring an operating process, have successively performed thereon the necessary operating processes. In such a process none of these connection lines would experience special waiting periods.

The invention will now be more fully described in conjunction with the drawings showing preferred embodiments thereof.

FIG. 1 is a schematic representation of the apparatus of the persent invention in the form of a time division multiplex exchange system in which individually-designated connection lines are successively tested during a specified period of time by a common testing apparatus, and, after the testing of the identified connection lines for the existence of an operating condition requiring an operating process, the required operating processes are performed for all connection lines found in such an operating condition.

Figure 2:
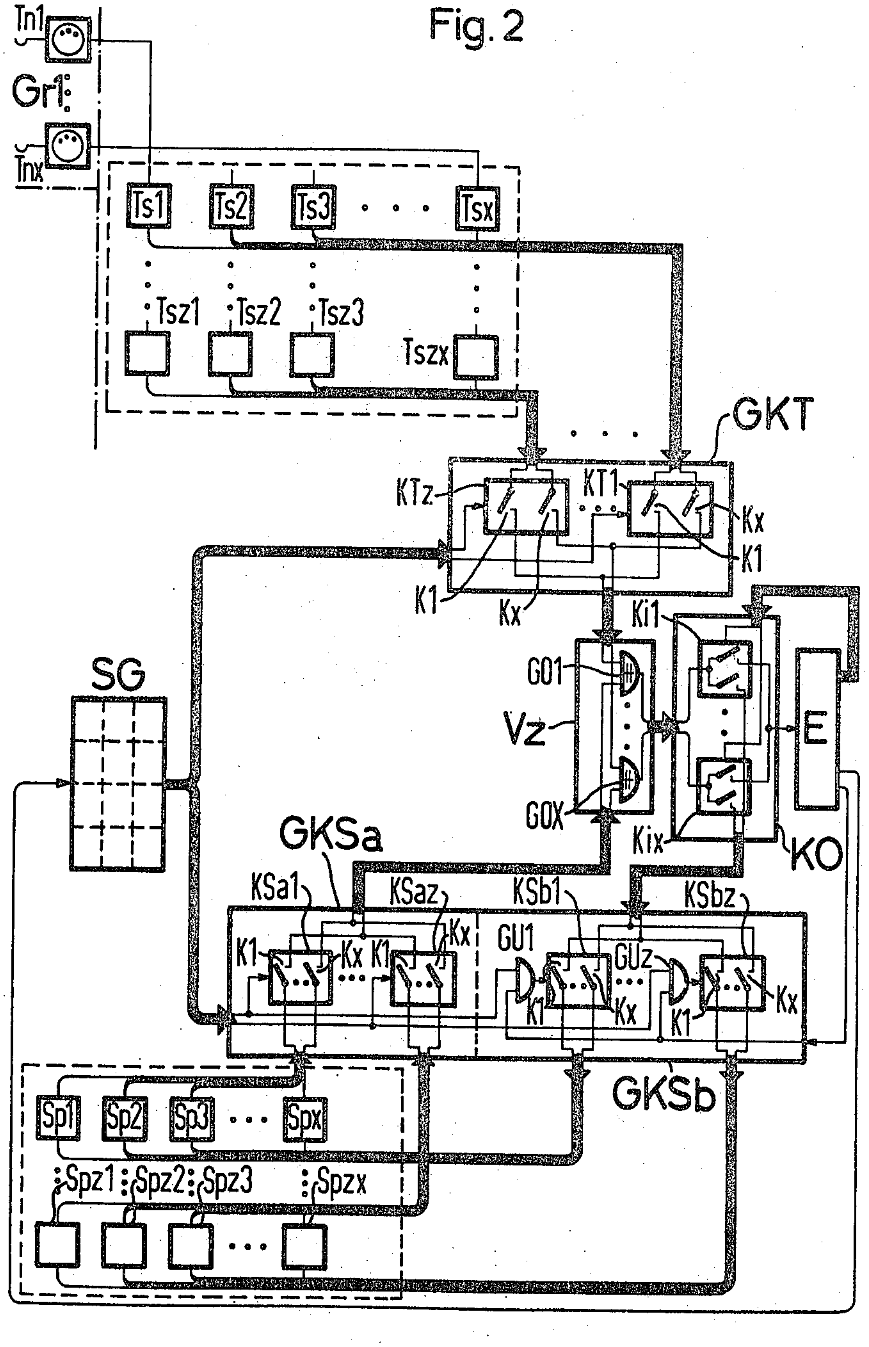

FIG. 2 is another circuit arrangement of an exchange system in accordance with the present invention in which the said connection lines are tested simultaneously by testing apparatus individually assigned to them for that purpose.

The time channel switches ZS1 . . . ZS*x* are periodically operated in pulse fashion by phase-displaced control pulses which cause the switches to serve as transmitters between subscribers in an existing connection, the time channel switches being operated by a synchronizing pulse assigned to that connection. The control pulses are supplied by means of a circulating address register U*a* and an associated decoder D*a*. The addresses assigned to the connections of the concerned subscribers circulate in the address register U*a*, so that they appear periodically at the outputs of the register. Each address in the address register U*a* circulates in a certain pulse phase. These circulating phases correspond to the pulse phases of the respective control pulses for the time channel switches ZS1 . . . ZS*x*. The different-phase control pulses each have the same frequency and are so timed as to permit other control pulses to fit between two successive occurrences of a certain control pulse.

Decoder D*a* is connected to the outlets of the circulating address rgeister U*a*, the decoder having as many outlets as there are subscribers associated therewith, each individual outlet being assigned to a certain subscriber. When the address of a subscriber is supplied to this decoder, then a pulse is supplied to the output assigned to this subscriber, which pulse serves to control the time channel switch associated with this subscriber.

The decoder D*a* is employed both for the control of the time channel switches ZS1 . . . ZS*x*, and also for the interrogation of subscriber circuits TS1 . . . TS*x*, for the operating conditions of the respective connection lines. For this purpose, as will be described hereinafter, the address of a connection line to be interrogated concerning its loop condition is supplied to the input of the decoder D*a* in an idle pulse phase. An address generator AG for identification for such lines is provided to interrogate the respective connection lines concerning their operating condition, that is, whether the subscriber loops are closed or opened, in successive repeated impulse fashion. This address generator supplies at any given time a basic addresses common to a plurality of connection lines. For instance, if the address of a subscriber has eight bits, the address generator AG supplies at one time, for example, the first five bits which identify all of the connection lines whose addresses correspond in these first five bits. Such a basic address, however, is supplied at any given time only for a certain period, as will be described more fully hereinafter; thereafter a new basic address is supplied by the address generator AG.

An address supplied by address generator AG at any given time is conducted directly to an input of a comparison apparatus or comparator VG*a*. The other input of this comparator VG*a* is connected to the circulating address store or register U*a*. The addresses circulating in this register U*a* are directed successively to the comparator VG*a* over this connection. These addresses consist of a first part, which corresponds to the basic addresses supplied by the address generator AG, and which are hereinafter identified as the basic address part, and also of a second part which will hereinafter be referred to as the supplemental address part. For example, for an eight bit address, the basic address part could be the first five bits and the supplemental address part, the last three bits.

The comparing apparatus VG*a* of the circuit arrangement of FIG. 1 includes a switch S*a* and the comparator V*a* which controls this switch. The comparator V*a* has two inputs, one of which receives the addresses supplied by the address generator AG and the other of which receives the basic address parts which are supplied from the circulating address register U*a* in the connection pulse phase assigned to this address. Upon identity between the basic address supplied from the address generator AG and a simultaneously-occurring basic address part, the comparator V*a* emits an actuating pulse to the switch S*a*.

A comparator for this purpose can be formed by a number of gates equivalent to the number of bits in the basic address. The subsequent supplemental address part, which corresponds to the basic address part of such occurring address is inserted in a storage apparatus S*pa* over the so-operated switch S*a*. Thereby one of the storage locations corresponding to this supplemental address part is marked, in such storage apparatus S*pa*. This process will now be described more fully.

A decoder D*s* is provided with the input of the storage apparatus S*pa*. The supplemental address part of an address corresponding in its basic address part with the basic address then supplied by the address generator AG is provided to the decoder D*s* over the actuated switch S*a* of the comparison apparatus VG*a*. The decoder D*s* has a number of outlets which correspond to the number of possible supplemental address parts. For instance, if the supplemental address part of an address consists of three bits, the decoder D*s* can be provided with eight outputs.

When a certain supplemental address part appears at the input decoder D*s*, a signal is supplied from its output assigned to this supplemental address part. A 1-bit-store K1 . . . K*m* is connected to each outlet of the decoder D*s*. These 1-bit-stores K1 . . . K*m* are also individually assigned to possible supplemental address parts. When a signal appears at one output of the decoder D*s*, the corresponding 1-bit-store is marked by switching from its existing operating condition to another operating condition, whereby the corresponding supplemental address part is now stored in a 1 out of *n* code in register S*pa*.

A coding device C*s* is connected to the output of each actuated 1-bit-store K1 . . . K*m*. The coding device, which is associated with an output switch A*s* of the storage apparatus *Spa*, causes translation of the stored supplemental address parts from the 1-bit-stores K1 . . . K*m* in the 1 out of *n* code, to the original code. The further operation of the output switch A*s* will be described hereinafter.

For further explanation of the function of the circuit arrangement shown in FIG. 1, let it be assumed that the address generator AG, immediately upon receipt from the central control apparatus E of a control signal, has switched forward by one step, so that a new basic address is now provided. At the same time that the forward switching of the address generator AG occurs, a control signal is provided to the circulating time element T shown in FIG. 1, this transit time being the same as the circulating period in which the addresses stored in the circulating address register U*a* circulate. Also, the 1-bit-store K1 . . . K*m* was positioned through the said signal in its above-named operating condition. The addresses registered in the circulating address register U*a* are now tested during a circulating period, to determine whether and which addresses with a basic address part corresponding with the basic addresses provided by the address generator AG are participating in a connection. Only when a connection line is not concerned with a connection is it in an operating condition which makes necessary the testing of this connection line, with respect to its loop condition, to identitfy the operating processes necessary to make a change to a new connection.

During the testing of the identified connection lines through the then-given basic addresses, when there is present at the output of the circulating address register U*a* an address corresponding in its basic address part with the basic address supplied at the same time from the address generator AG, the corresponding supplemental address part is transmitted over the swtich S*a* to the decoder D*s*. During this process the 1-bit-store assigned to this supplemental address is changed from one to its opposite condition.

After expiration of the circulating period of the circulating address storage device U*a*, there are addresses registered in the circulating register U*a* which correspond with the supplied basic address and there are 1-bit-registers K1 . . . K*m* in said one condition whose corresponding supplemental address parts are not registered in the circulating register U*a*, as part of an address which corresponds in its basic address part with the basic address then supplied from the address generator. There are now performed certain operating processes for the connection lines identified by these last supplemental address parts, together with the then-supplied basic addresses; those connection lines which at the time are not participating in a connection must be tested for their loop conditions in order to be able to ascertain a new connection order, if necessary. This process occurs as follows:

During the testing, the 1-bit-stores K1 . . . K*m* which are not switched from said one to another operating condition indicate the supplemental addresses of the connection lines which are to be tested for their loop condition, in a 1 of *n* code. As previously mentioned, these supplemental address parts which exist in code 1 of *n* are translated by the coder C*s* into the original code; the respective supplemental address is then supplied, with the further-supplied basic address from the address generator AG, combined as the address of a connection line which is interrogated concerning its loop condition. The supplemental address parts which are to be combined with the basic addresses supplied from the address generator AG are successively transferred from the storage apparatus S*pa*, by means of the output control switch A*s*. The access to the connection line identified by such a combined address takes place over a decoder connected with the output of the storage apparatus S*pa*, over which the connected lines jointly associated with the exchange apparatus are accessible. In the connection arrangement according to FIG. 1 such a decoder (DA) is already supplied for another reason, so that no further decoder need be provided.

The basic address still supplied from the address generator AG, and the simultaneously-provided supplemental address part from the coder C*s* are transferred to the input of the decoder D*a* by way of a switch S*c*. This switch S*c* was blocked by the central control apparatus E during the time period in which the addresses registered in the circulating register U*a* were compared in their basic address parts with the basic addresses supplied from the address generator AG; after expiration of the comparison time period, that is, after expiration of the circulation period T, the switch S*c* is triggered on from the central control apparatus. The switch S*c* remains in its closed condition from this point until a pulse phase when no subscriber address appears at the output of the circulating address register U*a*. In the circuit arrangement shown in FIG. 1, this is achieved by means of a gate G*f* which is connected to the output of the address register U*a*. In FIG. 1 this gate is shown as a NOR gate; however, it should be noticed that the gate delivers a switch-closing signal to the switch S*c* only when no subscriber identification appears at the output of the circulating register U*a*, that is, in a pulse phase in which no subscriber participates in a connection. Thereupon, the switch S*c* will transfer to decoder D*a* the address of a connection line whose loop is open, as indicated in response to an interrogating signal. This address is then supplied to the decoder D*a* during an idle pulse phase of the time multiplex exchange system.

In the pulse phase in which the address is delivered over the closed switch S*c* to the input of the decoder D*a*, there appears at the output of the decoder D*a* specified by this address a signal with whose assistance the connection line idntified by the given address is tested concerning its loop condition. For this purpose the said signal is transmitted to the subscriber circuit T*s* of the respective subscriber connection line.

In the apparatus of FIG. 1 the said signal also simultaneously causes the pulse-like operation of the respective time channel switch ZS; this operation, however, is without further significance, since as previously stated, the testing of the respective connection line regarding its loop condition occurs in an idle pulse phase; that is, in a pulse phase which is itself available for seizure for a connection, but at the moment is not seized for any connection.

A supervisory time multiplex line YM is connected to the central control apparatus E and functions in common for all of the subscriber circuits T*s*1 . . . T*sx*. Upon the interrogation of each connection line, criteria identifying its loop condition is transmitted over this supervisory multiplex line to the central control apparatus E. In the central control apparatus, if necessary, further control processes required by the loop condition of the then-interrogated impulse line can be caused to occur. If such questioning of a subscriber line identifies a loop closure, the central control apparatus E can, for example, solicit the registration in the circulating address register U*a*, still in the same idle pulse phase, of the address of this connection line, which then stands at the input of the decoder D*a*. Alternatively, this address can also be registered in the respective idle pulse phase in the circulating address register U*a*, and can be released upon absence of determination of a loop closure. Further, it is also possible to register the respective address in another idle pulse phase in the circulating register U*a*.

In any case a connection pulse phase is assigned after determination of a loop closure of the respective connection line, by registration of the address of that line in an idle phase in the circulating address register U*a*. In order that the connection desired by the respective subscriber can be established, the address, formed in appropriate fashion through the combination of the basic address supplied from the address generator AG with the supplemental address supplied from the output switch A*s*, is provided until the operating processes required to be performed for the respective connection line, by reason of its loop condition, have been completed. If necessary, further such addresses are supplied in similar fashion. In the circuit arrangement of FIG. 1 this can be accomplished after the completion of the operating processes performed for a connection line by reason of its loop condition, by marking of the 1-bit-store of the storage or register apparatus S*pa* which is assigned to the supplemental address part of the address, that is, by switching of the store from one operating condition to another. Further, this is accomplished by supplying from the next following 1-bit store which is not marked, its corresponding supplemental address and combining therewith the basic address next supplied by the address generator AG to form the address of a further connection line to which interrogation concerning its loop condition can be directed. For this purpose, in the apparatus of FIG. 1, a control line leading from the central control apparatus E to the output control switch A*s* is provided. Also the next following supplement address part can be transmitted directly over this control line when the central control apparatus E has received a loop disconnection or interruption signal from a then-interrogated subscriber, or at least has received the identification criteria for such interruption.

After the addresses of the connection lines to be interrogated further have been provided in this way in further idle pulse phases, and the respective connection lines have been thus interrogated concerning their loop conditions, a signal is transmitted from the output switch A*s* to the central control apparatus E over the control line, which signal causes the control apparatus E to provide to the address generator AG an order for that address generator to supply a new basic address common to another plurality of connection lines. At the same time as the transmittal of this order to the address generator AG, the 1-bit stores K1 . . . K*m* are switched to the said one of their operating conditions (reset). The processes described above are now repeated in corresponding fashion for the connection lines identified by the new basic address.

It is apparent from the above that only those connection lines are tested for their loop conditions in the described manner which are not at the time busy in a connection. Such connection lines which are already occupied in a connection are excluded from corresponding interrogation concerning their loop condition, for obvious reasons of economy of operation. In order that this advantage can be obtained, before the next interrogation, the address of each connection line is compared with the addresses registered in the circulating address register, identifying the subscribers already participating in a connection, during the entire time period employed, this being the same as the circulating period of the circulating address register.

Since the address generator supplies a signal identifying a plurality of connection lines, namely the said basic address, and the identified connection lines are jointly tested during the said time period in such manner as to determine whether they are not already occupied in a connection, the result is that the central control apparatus can serve a much larger number of connection lines for repeated interrogation thereof than would be the case if a purely successive method of interrogation of the connection lines were employed. The described employment of any arbitrary idle pulse phase for interrogation of the respective connection lines has the advantage that it is not necessary in such a case to employ special time channels which could not be seized for connections. Rather, only time channels are employed which then are not used for connections because of the then-existent operating condition of the entire exchange system.

A further modification of the apparatus shown in FIG. 1 can be provided by which the address generator AG provides both the basic addresses common to a large number of connections lines T*s*1 . . . T*sx*, and also the supplemental addresses of the corresponding connection lines. These supplemental addresses can be stored in specially provided storage locations of the storage apparatus S*pa*. At any given time, by identity between the basic address provided from the address generator AG and the basic address part of an address stored in the circulating address generator U*a*, both the basic address and the supplemental address are released by the marking of the corresponding storage locations. In this case it is not necessary to provide the storage apparatus *Spa* shown in FIG. 1 with a special coder.

The circuit arrangement shown in FIG. 2 will now be specially described. This circuit arrangement serves to perform the process of the invention by which, in an exchange system, and particularly an exchange system for telephone purposes, connection lines of subscribers T*n*1 . . . T*nx* are repeatedly questioned concerning their operating conditions, as for example, whether their loop circuits are closed or opened. Further, the apparatus serves to compare the interrogation results obtained from the respective connection lines with interrogation results from preceding interrogations stored in corresponding registers. Additionally, the apparatus serves to cause the performance of the operating processes necessitated by the ascertainment of changed operating condition.

The apparatus shown in FIG. 2 includes a control generator SG which from time to time provides access signals for a plurality of subscriber circuits T*s*1 . . . T*sx* associated with subscribers T*n*1 . . . T*nx*, as well as to the stores S*p*1 . . . S*px* respectively assigned to the subscriber circuits. These signals are transmitted over contact sets KT, KS*a*, KS*b* of groups GKT, GKS*a*, GKS*b*, to a comparison apparatus VZ, where they are compared with the outputs of the stores S*p*1 . . . S*px* assigned to the respective subscriber circuits T*s*1 . . . T*sx*.

The several contact groups GKT, GKS*a*, GKS*b*, each consist of a row of contact sets, respectively, KT1 . . . KT*z*, KS*a*1 . . . KS*az*, and KS*b*1 . . . KS*bz*. Each contact set comprises a certain number of simultaneously operated contacts K1 . . . K*x*. Each of the contacts *k*1 . . . *kx* which together comprise contact set KT1 . . . KT*z*, is connected at one terminal thereof with a subscriber circuit T*s* of a group of subscribers circuits T*s*1 . . . T*sx*, so that the instantaneously existing loop condition of the corresponding connection line can be interrogated over the subscriber circuits. The corresponding contacts of the different contact sets KT1 . . . KT*z* of the contact set group GKT are connected on their other sides with inputs of comparators GO1 . . . GOX of the comparison apparatus V*z*. For example, contacts K*x* of the contact sets KT1 . . . KT*z* are jointly directed to an input of the comparator GOX.

The comparators GO1 . . . GOX of the comparison apparatus VZ can be constructed, for example, with an exclusive OR gate having two inputs. The other inputs of the comparators GO1 . . . GOX of the comparison apparatus VZ are connected in analagous fashion with other corresponding contacts of the contact sets KS*a*1 . . . KS*az* of the contact set group GKS*a*. The inputs of the inputs of the contacts of this contact set group GKS*a* are connected with the outputs of store S*p* respectively assigned to the subscriber circuits.

In a circuit arrangement according to FIG. 2 the output or outlet lines of the comparators GO1 . . . GOX are respectively connected to one side of two contacts of sets of contact pairs K*il* . . . K*ix*. The other side of one contact of each contact set is connected to a central control apparatus E. The other contacts of the contact pairs K*il* . . . K*ix* lead to other corresponding contacts K1 . . . K*x* of the contact sets KS*b*1 . . . KS*bz* of the third contact set group GKS*b*. For instance, the lower contact of the contact pair K*ix* is jointly connected with the contacts K*x* of the contact sets KS*b*1 . . . KS*bz* of the contact set group GKS*b*. The contacts of this contact set group GKS*b* are connected on their other sides to the inputs of the stores S*p*, in analogous fashion to the above-described connection of the contacts of the contact set group GKS*a* to the outputs of the stores S*p*. For example, the contact K*x* of the contact set KS*bz* is connected to the input of the store S*pzx*.

The circuit arrangement of FIG. 2 operates as follows:

As indicated above, the control generator SG provides access signals at the same time to a plurality of connection lines, and to associated stores or registers. The control generator can thereby be constructed as a shift register with a number of shift stages corresponding with the number of groups of subscriber circuits T*s*1 . . . T*sx*, the shift register having a pulse circulating therein and the output of each shift stage leading to the control input of a contact set in each of the contact groups GKT, GKS*a* and GKS*b*. In such a system, when one of the output lines of the control generator SG is provided with an actuating voltage, then the contacts *k*1 . . . K*x* of the corresponding contact sets are closed for the duration of this actuating voltage.

For example, it will be assumed that the control generator SG provides a signal which operates the contacts K1 . . . K*x* of the contact sets KT*z*, KS*az* and KS*bz*. Thereby a plurality of connection lines, namely the same connection lines whose subscriber circuits belong to the group of subscriber circuits T*sz*1 . . . T*szx*, together with the stores or registers assigned thereto which are in the group of registers S*pz*1 . . . S*pzx*, are energized. As a result, the corresponding connection lines are now interrogated concerning their loop conditions, and at the same time the corresponding stores are interrogated concerning whether information as to the pre-existing loop condition of the corresponding connection lines is stored therein. The interrogation results are led over the thereby closed contacts K1 . . . K*x* of the contact sets KT*z* and KS*az* to the comparators GO1 . . . GOX of the comparison apparatus VZ. During the time period in which a group of connection lines are interrogated concerning their pre-existing operating condition, the comparators GO1 . . . GOX are successively triggered and provide upon lack of identity between the two sets of interrogation results a signal to the central control apparatus, through which signal the required operating processes are performed. By lack of identity between the two provided interrogation results there is indicated a change in the operating condition of the respective connection line as compared with the previously existing loop condition of this line, which previous condition is indicated in the respective store. Such a change in the operating condition of the respective connection line makes necessary the performance of certain operating processes. For example, if in the respective store, by reason of an earlier interrogation, a certain line is identified as having its loop open, and in response to a new interrogation it is ascertained that the same line has closed its loop, this can mean that the connected subscriber wishes to establish a connection. On the other hand, if it is ascertained that a line which previously had a closed loop now shows a disconnect, it can meain that the existing connection should be released. In each case, appropriate operating processes must be performed.

In order to ascertain an operating condition demanded of particular connection lines within a then-controlled group of connection lines, the individual comparators GO1 . . . GOX of the comparison apparatus VZ are successively actuated, at the same time as the after-connected contact pairs K*i*1 . . . K*ix*. As indicated in FIG. 2 by the extension of control lines from the central control system E to the control systems of individual contact pairs K*i*1 . . . K*ix*, this actuation originates from the central control system E. A signal indicating a change in operating condition of the respective connection line is transmitted over the upper contact of the then-operated contact pair to the central control apparatus E from the respective comparator. As a result of this signal, the central control system E can perform the operating processes required for the respective connection line, that is, if necessary it can undertake establishment of a connection or the interruption of that connection, depending upon the circumstances. The performance of this operating process will not itself be further described since it is not necessary to the understanding of the invention.

As is shown in FIG. 2 in this connection, on the performance of such operating conditions required by the respective connection line, a new interrogation result is stored in the respective store in place of the previously registered interrogation result. For this purpose, a corresponding signal is transmitted from the respective comparator over the lower contact of the respective contact pair to the input of the store S*p* assigned to the respective connection line, over the then-closed contact of the contact set group GKS*b*. As indicated in FIG. 2, the timing of this transmission is controlled by the central control system E. A control line extends from the central control apparatus E to an input of each of AND gates GU1 . . . GU*z* which are connected to the control inputs of the contact sets KS*b*1 . . . KS*bz* of the contact set group GKS*b*. A signal then supplied from the control generator SG is also directed to each of the AND gates. For example, the contact set KS*bz* is so controlled by the control generator SG that only those contacts K1 . . . K*x* which are supplied with a corresponding trigger signal from the control apparatus E to the gate GU*z* are placed in transmitting condition.

After the connection lines jointly identified by the signal supplied from the control generator SG through the comparators GO1 . . . GO*x* individually assigned to them are tested in the above described manner for the existence of an operating condition requiring a certain operating process, namely for the occurrence of a loop condition change, and after the required operating process for a connection line found to be in such an operating condition has been performed, central control apparatus E can supply signals for the operation of further contact pairs K*i*, so that in corresponding manner the operating processes required by such further connection lines by reason of their changed loop condition can be performed. In such fashion the performance of such operating processes can be carried out for all connection lines found in an operating condition requiring operating processes, or only for selected ones of the previously found connection lines. If necessary, after the testing of the connection lines identified by the control generator SG for the existence of an operating condition requiring an operating process, it is possible to perform only the operating process required for a particular preferred connection line previously found to require that process. After execution of all of the operating conditions to be performed, a signal is transmitted over a control line leading from the central control apparatus E to the control generator SG, by which signal the supply of control signals to another plurality of connection lines, as well as to the associated stores, is released. In the above-described example of a control generator SG formed as a shift register, the shift register can transfer a shift pulse. The processes described above for a group of subscriber connection lines then repeat themselves in corresponding manner for the next group of subscriber connection lines.

It should be especially noted that the apparatus GKT, GKS*a*, GKS*b* and KO schematically indicated in FIG. 2 as contact combinations for facilitation of the understanding of the invention, in fact can be formed in other appropriate ways. Thus especially instead of the contact pairs K*i*1 . . . K*ix* contained in the apparatus KO for the triggering of the comparators GO1 . . . GO*x* of the comparison apparatus V*z*, there could be provided a command or control switch which makes effective only one of the signals from the comparator, for performance of the operating processes required for the respective connection line. In order to permit further operating processes demanded by connection lines the command switch can be so constructed that it makes effective a signal supplied by another comparator for establishment of the operating processes required by the corresponding other connection line, after performance of the operating processes required for a connection line. Command switches of such construction are in themselves known, so that no further description thereof is necessary.

The function of the individual contacts of the contact sets shown in FIG. 2 at KT, KS*a*, and KS*b* can also be performed if gate switches are provided in the individual subscriber circuits T*s* and in the associated stores or registers S*p*, and information appearing at an input of the comparison apparatus V*z* is supplied to those gate switches, so that the gate switches of a group of subscriber circuits T*s*1 . . . T*sx* and of the corresponding group of stores S*p*1 . . . S*px* are triggered by the control signal simultaneously provided by the control generator SG. Such a gate switch can be formed by a magnetic core having a rectangular hysteresis loop and whose magnetic condition corresponds to the instantaneous loop condition of the respective connection line, or to the previous interrogation result from this line. With this system the ring cores of a group of subscriber circuits or the corresponding stores can be interrogated concerning their magnetic condition by the signals provided by the control generator SG.

If it is desired only to release in the above described manner a performance of exchange processes when it is newly ascertained that a connection line which was previously in loop disconnect condition, is now in loop closed condition, the comparison apparatus V*z* can be formed of a number of blocking gates instead of the exclusive OR gates shown in FIG. 2. In such case the stores S*p* associated with the individual connection lines lead to the blocking inputs and a loop interruption will provide a signal "0" and a loop closure will provide a signal "1."

Finally, it should be noted that, in addition to the result of a previous interrogation of the respective connection line, the stores S*p* can also have stored therein additional special information, as for example information as to the connection-capacity of the respective connection line.

It will further be appreciated that many minor changes could be made in the apparatus described above, without departure from the scope of the invention. Accordingly, the invention is not to be considered limited to the embodiments described hereinabove, but rather only by the scope of the appended claims.

We claim:

1. A method for the performance of operating processes within an exchange system to which multiple connection lines are connected, such exchange system being provided with a common central control apparatus having a common control generator successively delivering different basic address signals each identifying pluralities of such connecting lines and testing the operating condition of the respective line circuits, and thereupon, if necessary, performing said operating processes, characterized as follows:

delivering during a given time a basic address signal identifying a plurality of connection lines (T*s*1 . . . T*sx*) from the control generator (AG, FG), testing all said plurality of connection lines for operating condition within said given time of delivery of that basic address signal, and performing the necessary operating processes.

2. The method of claim 1 further characterized by further successive testing of operating conditions of said connection lines by a central testing equipment (VG*a*, S*pa*) during the said given time.

3. The method of claim 1, further characterized by simultaneous further testing of operating conditions of connection lines not participating in connections (T*s*1 . . . T*sx*) by individually associated testing devices (GO1 . . . GOX) during said given time.

4. The method of claim 1 further characterized by performance of the necessary operating processes only on a selected connection line (T*s*1 . . . T*sx*) found in a demanding operating condition by the operating condition testing.

5. A circuit arrangement for performing operating processes within an exchange system to which multiple connection lines are connected, said exchange system being provided with a common central control apparatus having a common control generator successively delivering different basic address signals, each signal identifying pluralities of such connecting lines and testing the operating condition of the respective connection lines and thereupon if necessary, performing said operating processes, the addresses assigned to connection lines participating in connections being stored in an address register, an address generator identifying such a connection line being provided for repeated successive pulse-wise interrogation of the individual connection lines, for their operating condition, i.e., whether the subscribers' loops are closed or open, comprising said address generator (AG) being operable cyclically to provide a basic address common to a plurality of connection lines (T*s*1 . . . T*sx*); a comparator (VA) receiving inputs from both the address generator (AG), and the address register (U*a*) said comparator being operable to compare the basic addresses with the basic address parts of addresses stored in the address register, which stored addresses consist of basic address parts and supplemental address parts;

and a storage apparatus (S*pa*) having the possible supplemental address parts stored in individually-assigned storage locations (K1 . . . K*m*);

said comparator being operable to mark the supplemental address part of each address stored in the address register in the assigned storage location, upon identity between the basic address supplied by the address generator and the basic address part of the address registered in the address register (U*a*);

said storage apparatus being operable to provide a supplemental address of an address not stored in the address register from at least one unmarked storage location (K), after comparison of the basic address supplied from the address generator (AG), with all of the addresses registered in the address register (U*a*), and being further operable to combine this supplemental address with the basic address supplied by the address generator (AG), to form for interrogation purposes the address of the connection line (T*s*), to which questions about the loop condition may then be placed.

6. The circuit arrangement of claim 5 including a decoder (D*s*) operable to mark the storage location (K) of the storage apparatus (S*pa*) assigned to the supplemental address part, following the completion of the operating processes which are to be performed immediately for a connection line (T*s*), by reason of its loop condition, and means then causing the respective supplemental address part to be emitted from the next-following non-marked storage location (K) and combined with the basic address supplied by the address generator (AG), to form the address of a connection line (T*s*) to which may be supplied questions about its loop condition.

7. The circuit arrangement of claim 6 including a decoder (D*a*) connected to the output of the storage apparatus (S*pa*), the connecting lines associated with the exchange apparatus being jointly accessible by said decoder, the decoder being supplied with said combined address to cause connection of the designated connection line (T*s*) to said circuit arrangement.

8. The circuit arrangement of claim 5 having a switch (S*a*) controlled by the comparator (V*a*) and a decoder (D*s*), said switch being operable to deliver to the input of the decoder (D*s*) the supplemental address part of an address stored in the address register (U*a*), upon identity between the basic address supplied by the address generator (AG) an the basic address part of said address stored in the address register, and a coder (C*s*), the storage locations of the storage apparatus (S*pa*) being compose of 1-bit-stores each of which is assigned to a possible supplemental address, with the stores connected to the coder (C*s*), said coder being operable, if necessary, to deliver the supplemental address, combined with the basic address supplied by the address generator (AG).

9. The circuit arrangement of claim 5 in which said address generator (AG), in addition to providing basic addresses common to a plurality of connection lines (T*s*1 . . . T*sx*), is further operable to provide supplemental addresses of the respective lines (T*s* . . . T*sx*), said address generator being connected to storage apparatus (S*pa*) to cause simultaneous recording in respective register locations (K) of the storage apparatus (S*pa*) of the supplemental address then being supplied by the address generator.

10. Circuit arrangement according to claim 5 in a time division multiplex exchange system having a multiplex highway to which said connection lines are connected in time-spaced pulse phases by operation of the address register (U*a*), a decoder (D*a*) and time channel switches (ZS1 . . . ZS*x*) said storage apparatus being operable to supply to the input of the decoder (D*a*) the address of a connection line to be interrogated for its loop condition, in an idle pulse phase, for use thereby in such an interrogation, said address register being operable to store the addresses of connection lines registered therein in phase-spaced circulating fashion, the address register (U*a*), with the aid of the decoder (D*a*) being cooperable to control the time channel switches (ZS1 . . . ZS*x*) of the connecting lines (T*s*1 . . . T*sx*) participating in the connections associated with said switches.

11. A circuit arrangement for the performance in an exchange system, particularly for telephone purposes, of a process wherein connection lines are repeatedly interrogated about their operating conditions (loop open or closed), the interrogation result compared with the result of a preceding interrogation of this line recorded in a register associated with the respective connection line, and where, in the event of a change in the operating condition, necessary operating processes are commenced; such circuit arrangement comprising a control generator (SG) operable to simultaneously supply control signals to a plurality of connection lines (T*s*1 . . . T*sx*) and to associated stores (S*p*1 . . . S*px*), a corresponding number of successively triggered comparators (GO1 . . . GO*x*) which each unlock during the same time period during which the control generator (SG) supplies the control signal to corresponding connecting lines (T*s*1 . . . T*sx*) and to registers (S*p*1 . . . S*px*), said comparators (GO1 . . . GO*x*) being operable upon reception of the interrogation result from a respective connecting line (T*s*) and its register (S*p*), to supply a signal upon lack of identity between the condition of said line and said register by which the performance of the necessary operating processes can be initiated.

12. The circuit arrangement of claim 11 further comprising a switch system which triggers comparators (GO1 . . . GO*x*) and which makes effective only one of the signals supplied by one of the comparators (GO) for the performance of operating processes for the respective connection line (T*s*).

13. The circuit arrangement of claim 12, said switch system further comprising means operable, following the performance of the operating processes required by the respective connection line, to render effective a signal from another one of the comparators for the corresponding other line circuits.

References Cited

UNITED STATES PATENTS

| | | | |
|---|---|---|---|
| 3,225,144 | 12/1965 | Gebhardt et al. | 179—27 |
| 3,347,992 | 10/1967 | Von Sanden et al. | 179—15 |
| 3,200,202 | 8/1965 | Harris | 179—18 |
| 3,366,737 | 1/1968 | Brown | 178—53.1 |

KATHLEEN H. CLAFFY, Primary Examiner

ALBERT B. KIMBALL, JR., Assistant Examiner

U.S. Cl. X.R.

179—18